3,386,988
DISAZO DYES CONTAINING DICARBOXYLIC
ACID IMIDOETHYL SULFONYL GROUPS
Max A. Weaver and John L. Dale III, Kingsport, Tenn.,
assignors to Eastman Kodak Company, Rochester, N.Y.,
a corporation of New Jersey
No Drawing. Filed Oct. 22, 1965, Ser. No. 502,431
7 Claims. (Cl. 260—152)

ABSTRACT OF THE DISCLOSURE

Azobenzene-azo-aniline compounds having a dicarboximidoalkylsulfonylalkyl group attached to the aniline nitrogen atom are useful as dyes for hydrophobic textile materials.

This invention relates to novel water insoluble disazo compounds and, more particularly, to disazo compounds, such as disazo dyes, containing an imidoethylsulfonyl group.

The disazo dyes of the invention are characterized by the general formula

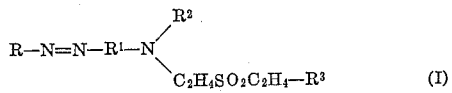
(I)

wherein:
R represents a substituted or nonsubstituted azobenzene group having the formula

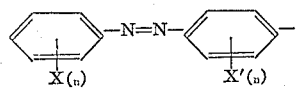

wherein X and X' represent lower alkyl, e.g. methyl; lower alkoxy, e.g. methoxy; halo, e.g. chloro; nitro; lower alkylsulfonyl, e.g. methylsulfonyl; lower alkylsulfonamido, e.g. methylsulfonamido; dicarboxylic acid imido, e.g. succinimido, lower fluoroalkyl, e.g. trifluoromethyl; lower alkanoylamino, e.g. acetamido; cyano; carbamoyl; benzamido; thiocyano; lower alkylthio, e.g. methylthio; benzoxy; benzamino; benzylamino; N-alkylbenzylamino, e.g. N-phenylmethylamino; formyl; lower carbalkoxy, e.g. carbethoxy; benzoyl; lower hydroxyalkyl, e.g. hydroxyethyl and the like and $n$ may be 0 or 1 or 2;

$R^1$ represents a monocyclic carbocyclic aromatic radical of the benzene series, e.g. phenylene and substituted phenylene having the formula

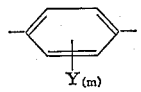

wherein Y represents lower alkyl, e.g. methyl; lower alkoxy, e.g. methoxy; halo, e.g. chloro; lower alkylsulfonamido, e.g. methylsulfonamido; dicarboxylic acid imido, e.g. succinimido; lower alkanoylamino, e.g. acetamido; benzamido; lower alkylthio, e.g. methylthio; and the like and $m$ may be 0 or 1;

$R^2$ represents hydrogen or an alkyl radical including unsubstituted alkyl, preferably lower alkyl, i.e. from 1 to 4 carbon atoms, and substituted alkyl such as hydroxyalkyl, e.g. hydroxyethyl; polyhydroxylalkyl, e.g. 2,3-dihydroxypropyl; lower alkoxyalkyl, e.g. methoxyethyl; cyanoalkyl, e.g. cyanoethyl; cyanoalkoxyalkyl, e.g. β-cyanoethoxyethyl; lower alkanoyloxyalkyl, e.g. acetoxyethyl; loyer carbalkoxyalkyl, e.g. carbethoxyethyl; halogenoalkyl, e.g. chloroethyl; hydroxyhalogenoalkyl, e.g. β-hydroxy-γ-chloropropyy; lower alkylsulfonylalkyl, e.g. methylsulfonylethyl; lower alkyl-OCOOCH$_2$CH$_2$—, e.g. CH$_3$OCOOCH$_2$CH$_2$ carbamoylalkyl, e.g. carbamoylethyl; lower alkylcarbamoylalkyl, e.g. ethylcarbamoylethyl; benzyl, phenoxyalkyl, e.g. β-phenoxyethyl; lower alkylsulfonamidoalkyl, e.g. methylsulfonamidoethyl; dicarboximidoalkyl, e.g. β-dicarboximidoethyl, etc. or $R^2$ represents a monocyclic carbocyclic aromatic radical of the benzene series, e.g. unsubstituted phenyl and substituted phenyl such as represented by $R^1$ above, e.g. lower alkylphenyl, lower alkoxyphenyl, halophenyl, etc. A preferred group represented by $R^2$ includes hydrogen, alkyl, alkoxyalkyl, phenoxyalkyl, alkanoyloxyloxyalkyl, haloalkyl, hydroxyalkyl, carbethoxyalkyl, dicarboximidoalkyl, alkylsulfonylalkyl or cyanoalkyl, the alkyl groups of which are lower alkyl. As can be seem from the examples given below, the substituents attached to the R, $R^1$ and $R^2$ groups serve primarily as auxochrome groups to control the color of the azo compound.

$R^3$ represents a dicarboximido radical, e.g. e.g. a radical having the formula

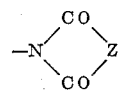

wherein Z represents a substituted or nonsubstituted hydrocarbon radical or group of carbon atoms necessary to complete the cyclic imide, such as alkylene $$(-CH_2CH_2-)$$

and substituted alkylene, e.g. hydroxyalkylene, lower carbalkoxyalkylene, haloalkylene, cyanoalkylene; vinylene (—CH=CH—); o-phenylene

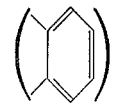

and substituted o-phenylene; cycloalkylene, e.g. pentamethylene and the like.

The novel disazo dyes of the invention, characterized by Formula I, are prepared by coupling a conventional diazonium salt of a compound having the formula $$R-NH_2 \qquad (II)$$

with a coupling component having a formula

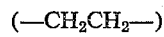
(III)

wherein R, $R^1$, $R^2$ and $R^3$ are defined above.

Thus, the schematic reaction is illustrated as follows:

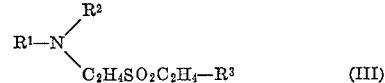

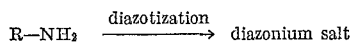

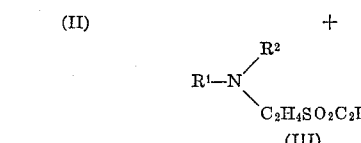

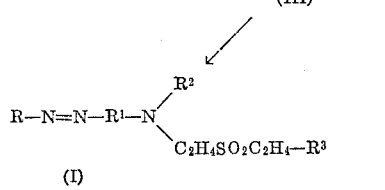

The coupling components, represented by Formula III above, are prepared by the reaction of an alkyl- or aryl-dicarboximide with a vinylsulfonylethylaniline derivative, the reaction being schematically illustrated as follows:

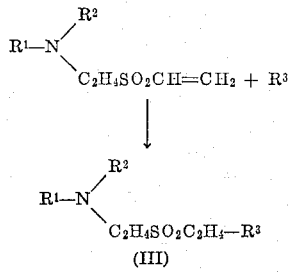

The preparation of the coupling components and representative dyes produced therefrom will be more fully illustrated by the following examples.

EXAMPLE 1

(a) *Preparation of the coupler.*—One ml. of 40% aqueous Triton B was added to a stirred slurry of 7.35 g. phthalimide, 0.5 g. hydroquinone and 25 ml. dioxane. A solution of 12.65 g. N-β-vinylsulfonyl-ethyl-m-toluidine (prepared by reaction of N-ethyl-m-toluidine and divinylsulfone in the presence of acetic acid and a hydrocarbon solvent) in 15 ml. dioxane was added dropwise during 15 minutes. The reaction mixture was stirred and heated at reflux for 2½ hrs. and then drowned in water. The solid which formed was crystallized from ethanol. It melts at 117–118° C.

*Analysis.*—Calc'd: C, 63.0; H, 6.0; N, 7.0. Found: C, 63.19; H, 6.06; N, 6.80.

The coupler has the structure:

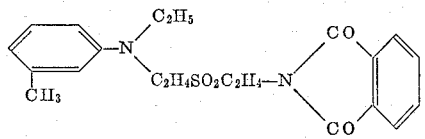

All of the couplers used in the following examples were prepared in accordance with the above procedure, with substitution of appropriate alkyl- or aryl-dicarboximide and vinylsulfonylethylaniline compounds.

(b) *Preparation of the dye.*—A solution of nitrosyl sulfuric acid was prepared by the careful addition of 1.44 g. NaNO$_2$ to 10 ml. conc. H$_2$SO$_4$. This solution was cooled to about 0° C. and 20 ml. 1:5 acid (1 part propionic:5 parts acetic) was added below 15° C. Then at below 5° C., 3.94 g. p-phenylazoaniline was added, followed by 20 ml. 1:5 acid. The reaction was stirred two hours at 0–5° C., then added to a solution of 8.00 g. of N-2-(2-phthalimidoethylsulfonyl)ethyl-N-ethyl-m - toluidine dissolved in 200 ml. 1:5 acid at 5° C. Solid ammonium acetate was added until the solution turned Congo red paper brown. The coupling was continued at this temperature for two hours, then drowned with water, filtered, washed with water, and dried. The product dyes nylon, cellulose acetate, and polyester fibers bright orange shades of excellent fastness. The dye has the structure:

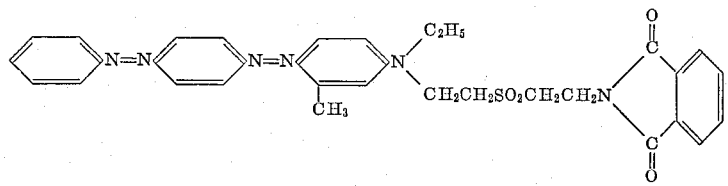

EXAMPLE 2

An amount of 3.94 g. of p-phenylazoaniline was diazotized as in Example 1. This solution was added to a chilled solution of 7.0 g. of N-ethyl-N-[2-(2-succinimidoethylsulfonyl)ethyl-m-toluidine dissolved in 100 ml. 1:5 acid. The reaction was then neutralized to brown on Congo red paper with solid ammonium acetate and allowed to couple 2 hr., all at 0–5° C. The reaction was then drowned with water, filtered, washed with water and the product air dried. It dyes cellulose acetate, polyamide, and polyester fibers bright orange shades with excellent fastness properties. The dye has the structure:

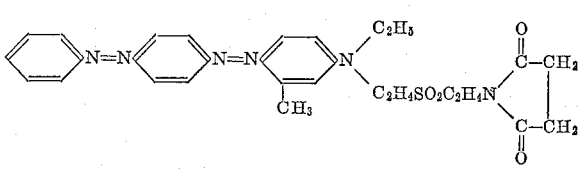

EXAMPLE 3

An amount of 4.62 g. 4-amino-3-chloroazobenzene was diazotized using the procedure and same quantities of NaNO$_2$, conc. H$_2$SO$_4$, and 1:5 acid as described in Example 1. This solution was added to a chilled solution of 7.5 g. of N - ethyl - N - [2 - (2-succinimidoethylsufonyl) ethyl]-m-chloroaniline in 100 ml. of 1:5 acid at about 10° C. Solid ammonium acetate was added until the solution turned Congo red paper brown. After allowing to stand 2 hr. at about 10° C., the coupling was drowned with water, filtered, washed with water, and air dried. The dye colors polyamide and polyester fibers deep shades of orange. It has the structure:

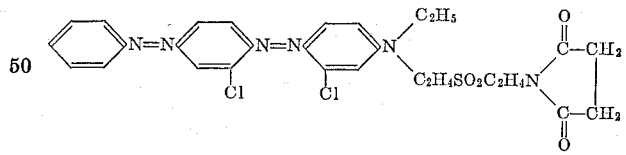

EXAMPLE 4

An amount of 4.50 g. 4-amino-2′,3-dimethylazobenzene was diazotized using nitrosyl sulfuric acid and 1:5 acid as illustrated in Example 1. The diazonium solution was added to a chilled solution of 7.3 g. N-ethyl-N-[2-(2-glutarimidoethylsulfonyl)ethyl]-m-toluidine in 100 ml. of 1:5 acid at ice-bath temperature. Solid ammonium acetate was added until the solution turned Congo red paper brown, and the mixture allowed to stand 2 hr. at ice-bath temperature. The coupling was drowned with water, filtered, washed with water, and the product air dried. The product obtained dyes nylon red shades with good fastness properties. It has the structure:

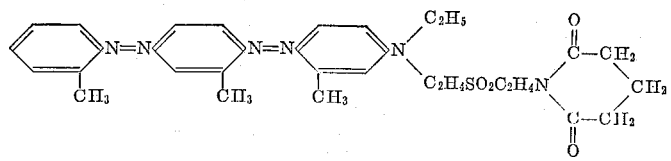

EXAMPLE 5

An amount of 4.22 g. 4-amino-4'-methylazonbenzene, was diazotized as illustrated in Example 1, and coupled with 7.0 g. of N-ethyl-N-[2-(2-succinimidoethylsulfonyl)ethyl]-m-toluidine. The dye imparts orange shades to cellulose acetate and polyamide fibers, with outstanding properties. It has the structure:

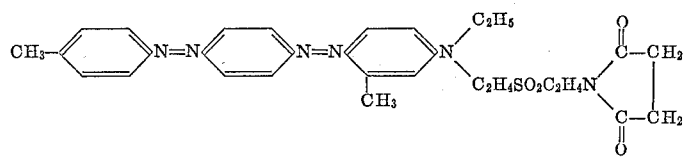

In accordance with Examples 1 through 5, additional dyes were prepared corresponding to the formula

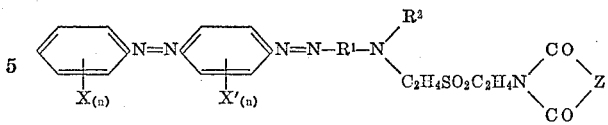

wherein X, X', $R^1$, $R^2$ and Z are set forth in the following table:

TABLE

| Example | X | X' | $R^1$ | $R^2$ | Z | Color |
|---|---|---|---|---|---|---|
| 6 | 2-$CH_3$ | 2-$CH_3$ | m-Tolylene | —$C_2H_5$ | ⌬ | Orange. |
| 7 | 3-acetamido | 2,5-di-O$CH_3$ | do | —$C_2H_5$ | —$CH_2$<br>—$CH_2$ | Red. |
| 8 | 3-hydroxymethyl | 2,5-di-O$CH_3$ | do | —$C_2H_5$ | $>(CH_2)_3$ | Violet. |
| 9 | 4-$CH_3$ | 2,5-di-O$CH_3$ | do | —$CH_3$ | —CHOH<br>—$CH_2$ | Do. |
| 10 | 4-$CH_3$ | 2,5-di-$CH_3$ | Phenylene | —$C_2H_4OH$ | —CHO CO $CH_3$<br>—$CH_2$ | Orange. |
| 11 | None | 2-chloro | m-Tolylene | —$C_2H_5$ | —$CH_2$—⌬ | Red. |
| 12 | 4-$CH_3$ | None | do | —$C_2H_4CN$ | ⌬ | Orange. |
| 13 | 4-NHCO$CH_3$ | do | do | —$C_2H_4CN$ | ⌬ | Do. |
| 14 | 4-$NO_2$ | 2,5-di-O$CH_3$ | do | —$C_2H_4CN$ | —$CHCH_3$<br>—$CHCH_3$ | Violet. |
| 15 | 4-N($C_2H_4OH)_2$ | None | do | —$C_2H_4CN$ | —CHCl<br>—$CH_2$ | Red. |
| 16 | 4-CO$CH_3$ | 3-$CH_3$ | m-Cl-phenylene | —$C_2H_5$ | —$CH_2$<br>—$CHCH_3$ | Red. |
| 17 | 4-Cl | 2-$CH_3$ | Phenylene | —$CH_3$ | —$CH_2$<br>—CHCN | Yellow. |
| 18 | 4-O$CH_3$ | 2,5-di-$CH_3$ | m-Tolylene | —$C_2H_4Cl$ | ⌬ | Red. |
| 19 | 4-$CH_3$ | 2,5-di-$CH_3$ | m-O$CH_3$-phenylene | —$C_2H_5$ | ⌬ | Red-orange. |
| 20 | None | None | m-Tolylene | —$C_2H_4OCOCH_3$ | ⌬ | Orange. |

TABLE

| Example | X | X' | R¹ | R² | Z | Color |
|---|---|---|---|---|---|---|
| 21 | do | do | do | —$C_2H_4OCH_3$ |  | Do. |
| 22 | do | do | do | —$C_2H_4SO_2CH_3$ |  | Do. |
| 23 | do | do | do | —$C_2H_4N\begin{smallmatrix}COCH_2\\ \ \ \ \ \ \|\\ COCH_2\end{smallmatrix}$ |  | Do. |
| 24 | do | do | do | —$C_2H_4OCOHN$—⟨ ⟩ |  | Do. |
| 25 | do | do | o-Tolylene | Hydrogen |  | Yellow. |
| 26 | do | do | m-Tolylene | —$C_2H_5$ | —$CH_2$<br>\|<br>—$CH_2$ | Orange. |
| 27 | do | 2-chloro | m-Chlorophenylene | —$C_2H_5$ | —$CH_2$<br>\|<br>—$CH_2$ | Do. |
| 28 | 2-$CH_3$ | 2-$CH_3$ | m-Tolylene | —$C_2H_5$ | —$CH_2$\\ \\ \ \ $CH_2$<br>—$CH_2$/ | Red. |
| 29 | 4-$CH_3$ | None | do | —$C_2H_5$ | —$CH_2$<br>\|<br>—$CH_2$ | Orange. |

The disazo compounds can be used for dyeing textile materials including protein and synthetic polymer fibers, yarns and fabrics giving a variety of fast brilliant violet to yellow shades including red, orange, yellow and violet when applied thereto by conventional dye methods. The disazo compounds have good affinity for cellulose ester and polyamide fibers. When the disazo compounds are used for dyeing such hydrophobic materials, they should be free of water-solubilizing groups such as sulfo and carboxyl. In general, the dyes have excellent fastness, for example, to light, washing, gas (atmospheric fumes) and sublimation. The dyes are outstandingly light and wash fast on nylon.

As described above, the present disazo compounds are characterized by an imidoethylsulfonylethyl group. This distinctive structure imparts unexpected properties to the present disazo compounds, especially when the disazo compounds are used for dyeing textiles, including improved fastness to light and improved affinity for polyester fibers. Thus, the disazo compounds of the invention can be expected to be superior to similar but distinct dyes when tested by methods such as described in the A.A.T.C.C. Technical Manual, 1964 edition, depending in part upon the particular dye used and the fiber being dyed.

The disazo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 2,043,827. The following examples illustrate methods by which the disazo compounds of the invention can be used to dye polyester textile materials.

0.1 g. of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc., 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dye bath is then brought to the boil and held at the boil for one hour. Following this, the fabric is rinsed in warm water, then scoured in aqueous 0.2% soap, 0.2% soda ash solution. After scouring, the fabric is rinsed with water and dried. Accordingly, since the disazo compounds of the invention are water-insoluble, they can be applied from aqueous dispersions in the manner of the so-called "dispersed dyes." However, coloration can also be effected, for example, by incorporating the disazo compounds into the spinning dope and spinning the fiber as usual. The disazo compounds of the invention have varying utility as dyes. The degree of utility varies, for example, depending upon the material being dyed and the formula of the disazo compound. Thus, for example, all the dyes will not have the same degree of utility for the same material. For example, the substituents on the R, R¹ and R² radicals, as mentioned above, serve primarily as auxochrome groups to control the color of the disazo compound.

Polymeric linear polyester materials of the terephthalate type are illustrative of the linear aromatic polyester textile materials that can be dyed with the new disazo compounds of our invention. The terephthalate fibers sold under the trademarks "Kodel," "Dacron," and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363 for example, can be dyed. The linear aromatic polyester materials specifically named have a melting point of at least 200° C.

Nylon, in fiber, yarn and fabric form, is representative of polyamides which can be dyed with the disazo compounds.

The invention has been described in considerable detail with particular reference to certain preferred embodiments thereof, but it will be understood that variations and modifications can be effected within the spirit and scope of the invention as described above and as defined in the appended claims.

What we claim is:

1. A disazo compound having the formula

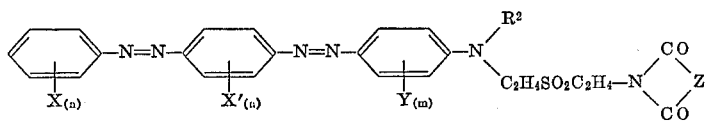

wherein:
  X represents lower alkyl, lower hydroxyalkyl, lower alkoxy, chlorine, nitro, lower alkylsulfonyl, lower alkylsulfonamido, succinimido, trifluoromethyl, lower alkanoylamino, acetyl, cyano, carbamoyl, thiocyano, lower alkylthio, di-(2-hydroxyethyl)amino, formyl, or lower carbalkoxy;
  X' and Y are the same or different and each represents lower alkyl, lower alkoxy, chlorine, lower alkylthio, lower alkanoylamino, lower alkylsulfonamido, or benzamido;
  $n$ represents 0, 1, or 2;
  $m$ represents 0 or 1;
  $R^2$ represents hydrogen; lower alkyl; lower alkyl substituted with hydroxy, lower alkoxy, cyano, lower alkanoyloxy, lower carbalkoxy, chlorine, lower alkylsulfonyl, lower alkyl —OCOO—, carbamoyl, lower alkylcarbamoyl, phenylcarbamoyloxy, phenoxy, lower alkylsulfonamido or succinimido; benzyl; phenyl; or phenyl substituted with lower alkyl, lower alkoxy, or chlorine; and
  Z represents ethylene; ethylene substituted with hydroxy, chlorine, lower carbalkoxy, cyano, acetoxy, or methyl; propylene; vinylene; cyclopentylene; or o-phenylene.

2. A disazo compound according to claim 1 wherein
  X represents lower alkyl, lower alkoxy, lower alkanoylamino, nitro, acetyl, or chlorine;
  X' and Y are the same or different and each represents lower alkyl, lower alkoxy, or chlorine;
  $n$ represents 0 or 1;
  $m$ represents 0 or 1;
  $R^2$ represents lower alkyl or lower alkyl substituted with hydroxy, lower alkoxy, lower alkanoyloxy, cyano, or chlorine; and
  Z represents ethylene, propylene, vinylene, or o-phenylene.

3. The dye:

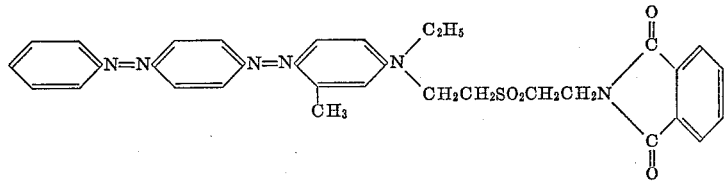

4. The dye:

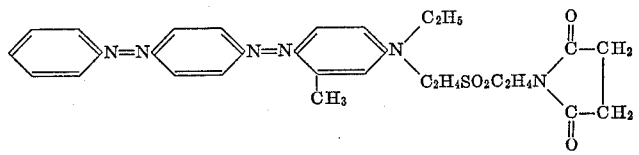

5. The dye:

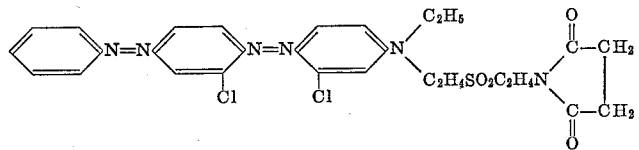

6. The dye:

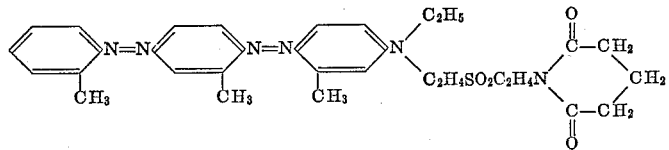

7. The dye:
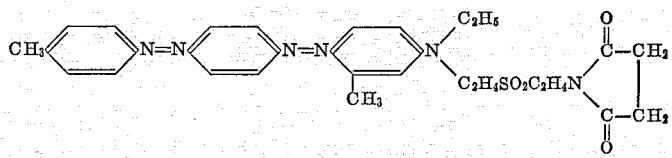
References Cited
UNITED STATES PATENTS
| | | | |
|---|---|---|---|
| 2,816,101 | 12/1957 | Breig et al. | 260—152 XR |
| 3,096,322 | 7/1963 | Straley et al. | 260—152 XR |
| 3,148,178 | 9/1964 | Wallace et al. | 260—152 |
| 3,148,180 | 9/1964 | Straley et al. | 260—152 XR |
FLOYD D. HIGEL, *Primary Examiner.*